(12) United States Patent
Berndt et al.

(10) Patent No.: US 7,004,865 B2
(45) Date of Patent: Feb. 28, 2006

(54) TENSIONING MEANS FOR TRACTION MECHANISMS, ESPECIALLY BELT TENSIONING MEANS

(75) Inventors: Thomas Berndt, Hof (DE); Rudolf Bonse, Attendorn (DE); Wolfgang Hamm, Mauden (DE); Joachim Jud, Daaden (DE); Manfred Jung, Roserath (DE); Thomas Muhr, Attendorn (DE); Jürgen Rohrmann, Finnentrop (DE)

(73) Assignee: Muhr und Bender KG, Attendorn (DE)

( * ) Notice: Subject to any disclaimer, the term of this patent is extended or adjusted under 35 U.S.C. 154(b) by 132 days.

(21) Appl. No.: 10/456,963

(22) Filed: Jun. 9, 2003

(65) Prior Publication Data

US 2004/0072643 A1 Apr. 15, 2004

(30) Foreign Application Priority Data

Jun. 7, 2002 (DE) ................................ 102 25 617

(51) Int. Cl.
*F16H 7/00* (2006.01)

(52) U.S. Cl. ...................................... 474/135; 474/109

(58) Field of Classification Search ................ 474/101, 474/109, 111, 133, 135; 384/567
See application file for complete search history.

(56) References Cited

U.S. PATENT DOCUMENTS

| 4,392,840 | A | 7/1983 | Radocaj |
| 4,725,260 | A | 2/1988 | Komorowski et al. |
| 4,826,471 | A * | 5/1989 | Ushio .......................... 474/135 |
| 6,231,465 | B1 * | 5/2001 | Quintus ....................... 474/133 |
| 6,863,631 | B1 * | 3/2005 | Meckstroth et al. ........ 474/135 |
| 2003/0008739 | A1 | 1/2003 | Asbeck et al. |

FOREIGN PATENT DOCUMENTS

| DE | 32 00 610 A1 | 7/1982 |
| DE | 42 43 331 A1 | 6/1994 |
| DE | 101 13 186 A1 | 10/2002 |
| DE | 101 31 916 A1 | 1/2003 |
| EP | 0 114 779 A1 | 8/1984 |
| EP | 0 294 919 A1 | 12/1988 |
| GB | 2090936 A * | 7/1982 |
| JP | 2001/165253 A | 6/2001 |

* cited by examiner

*Primary Examiner*—Vicky A. Johnson
(74) *Attorney, Agent, or Firm*—David S. Safran (57) ABSTRACT

A belt tensioning device for traction mechanisms includes a receiving and mounting housing, a pulley carrier pivotally connected to the receiving and mounting housing, a bearing supporting the pulley carrier relative to the receiving and mounting housing, and a spring located between the pulley carrier and the receiving and mounting housing for applying the tensioning force. The belt tensioning device, in normal operation, on the slack side between a generator and a main pulley can also be used when the slack side becomes the load side by a blocking mechanism which enables swinging motion of the pulley carrier relative to the receiving and mounting housing in a first direction, and limits or prevents such motion in a second, opposite direction.

2 Claims, 6 Drawing Sheets

TENSIONING MEANS FOR TRACTION MECHANISMS, ESPECIALLY BELT TENSIONING MEANS

BACKGROUND OF THE INVENTION

1. Field of the Invention

The invention relates to a tensioning means for traction mechanisms, especially a belt tensioning means, having a receiving and mounting housing, a pulley carrier pivotally connected to the receiving and mounting housing, a bearing which supports the pulley carrier relative to the receiving and mounting housing, and a spring located between the pulley carrier and the receiving and mounting housing for applying the tensioning force.

One special tensioning means for traction mechanisms is addressed in particular, that is, a belt tensioning means. The tensioning means for the traction mechanisms to which the invention relates is always addressed and described as a belt tensioning means. However, the described belt tensioning means can also be used for traction means in different ways, not only as a belt tensioning means.

2. Description of Related Art

In motor vehicles, various secondary assemblies are driven by the vehicle engine, for example, a generator, a water pump for water-cooled vehicle engines, a servo pump for motor vehicles with power steering, and a compressor for the air conditioner. Driving the secondary assemblies takes place via a main pulley on the crankshaft of the engine and a continuous drive belt which runs around the main pulley and around auxiliary pulleys on the drive shafts of the secondary assemblies. The adjustment and preservation of a predetermined tension of the drive belt are of special importance for the serviceability of the secondary assemblies and for the service life of the drive belt. To improve the serviceability of the secondary assemblies and to increase the service life of the drive belt, in general, a spring-loaded belt tensioning means is used which generally has a damping means, so that slip and vibrations can be equalized or reduced.

Recently, so-called belt starter generators (RSG which are also called integrated starter generators (ISG)) have been used in the train of pulleys. For the belt starter generators, the current flows through the generator and the generator is used as an electric drive. The main pulley, and thus the crankshaft of the vehicle engine, are accelerated roughly to idle rpm via the drive belt, whereupon the motor vehicle engine is then started. The starting phase in which the generator is used as an electric drive generally last less than one second.

The basic structure of a belt tensioning means—the receiving and mounting housing, the pulley carrier which is pivotally connected to the receiving and mounting housing, the bearing which in general radially and axially supports the pulley carrier relative to the receiving and mounting housing, a spring between the pulley carrier and the receiving and mounting housing for applying a tensioning force, and optionally a damping means—is known in many versions, for which reference is made to German patent publication nos. DE 41 34 354, DE 433 36 467, DE 43 00 178, DE 44 287 683, DE 196 03 558 and European patent publication EP 0 858 563. There are important differences principally with regard to the damping means employed in most belt tensioning means.

Published German Patent Application DE 42 43 331 discloses a contact transmission in which a drive wheel drives two driven wheels of two camshafts via a toothed belt, and as is generally conventional in the art, a belt tensioner is located on the slack side to produce the necessary belt tension. To reduce the tension peaks acting on the toothed belt in the area of the resonance points, in this contact transmission on the driving side—which is also often called the load side—there is another, elastically supported tension roller. This second tension roller is designed to prevent rapid fatigue of the toothed belt, by the variable tension components on the toothed belt, in the two directions by being cushioned and damped to a limited degree.

If the conventional belt tensioning means which is between the motor vehicle engine and the generator in normal operation on the slack side is used in conjunction with a belt starter generator, the use of the generator as an electric drive leads to the slack side becoming the load side or the driving side. This leads to the belt tensioning means being deflected against the tensioning force which has been applied by the springs. This in turn leads to less tension on the drive belt, and thus, to a degraded drive of the motor vehicle engine by the generator, operated as an electric drive, as a result of the slip. In order to compensate for this reduced tension of the drive belt which occurs in the starting phase, the belt tension would have to be increased overall, then the higher tension of the drive belt which is actually undesirable in "normal" generator operation would lead to premature wear of the drive belt, belt pulleys and secondary assemblies.

SUMMARY OF THE INVENTION

The primary object of this invention is to provide a tension means for traction mechanisms, especially a belt tensioning means, such that the adjusted preliminary tension of the traction mechanism remains essentially unchanged, regardless of whether the tension means is located on the slack side or briefly on the load side.

This object is achieved in the tension means for traction mechanisms of the invention by providing a blocking means which enables swinging motion of the pulley carrier relative to the receiving and mounting housing in a first direction, but limits or prevents swinging in a second, opposite direction. The first direction in which the swinging motion of the pulley carrier relative to the receiving and mounting housing is possible is thus the direction in which the pulley carrier is also pressed by the tensioning force of the spring against the drive belt.

The blocking means of the invention thus does not prevent the desired automatic re-tensioning of the drive belt by the belt tensioner. Conversely, swinging motion of the pulley carrier in the opposite direction is prevented by the blocking means so that the belt tensioning means, during operation of a belt starter generator as the electric drive, is not pulled back against the tension force of the spring. In this way, a reduction of the belt tension is prevented even if the belt tensioning means is located on the load side.

There are a host of embodiments for the blocking means of the invention. Essentially, there are two basic forms for the embodiments of the blocking means, i.e., catching between the pulley carrier and the receiving housing, either positively or non-positively.

In a first embodiment, the tensioning means of the invention, in which a non-positive interlocking is accomplished, the blocking means has a cam disk which is connected to the receiving and mounting housing with at least one cam, and the pulley carrier is connected to an external ball race, in which there are one or more clamp bodies, by frictional connection between the cam disk, the clamp bodies and the inner jacket surface of the outer ball race. In the embodiment, swinging motion of the pulley carrier relative to the receiving and mounting housing in the second direction is limited and/or prevented. Thus, between the stationary receiving and mounting housing and the swinging pulley carrier, a type of free-running clutch is implemented by the arrangement of the cam disk and the clamp bodies in the outer ball race. However, in the second swinging direction, with the stationary receiving and mounting housing not being entrained, blocking of the pulley carrier takes place.

According to a preferred development of the first embodiment of the blocking means of the invention, the clamp bodies each have a hole into which a respective pin-shaped driver fits, and the clamp bodies can be swung by the drivers within the outer ball race such that the clamp bodies interact, by adhesion, with the cam disk and the inner jacket surface of the outer ball race. In this way, switchable "free running" is accomplished, in which the blocking means implemented by the cam disk, the clamp bodies and the outer ball race can be switched between the free running and the blocking action. The belt tensioning means of the invention acts either like a "normal" belt tensioner, in which the pulley carrier, over a limited angular range, is supported to be able to swing in both directions relative to the receiving and mounting housing or like a fixed tension roller in which swinging of the pulley carrier relative to the receiving and mounting housing is prevented.

In the first embodiment, the tensioning means, as a belt tensioning means, when interacting with a belt starter generator acts as a "normal" belt tensioner when the drive belt is driven by the vehicle engine or driven by the main pulley on the crankshaft of the vehicle engine, i.e., the belt tensioning means is located on the slack side. Conversely, the belt tensioning means acts as a fixed tension roller when the belt starter generator is used as an electric drive. Then, the pulley of the generator drives the drive belt so that the belt tensioning means is located on the slack side.

The belt tensioning means according to the preferred embodiment constitutes an "intelligent" belt tensioner which, when in the short-term phase in which the belt starter generator is used as an electric drive, assumes the function of the tension roller; while the belt tensioning means otherwise acts as a "normal" belt tensioner.

According to another preferred embodiment, the tensioning means of the invention has a positively acting blocking mechanism. The blocking means is implemented by a two-part gearing which acts between the pulley carrier and the receiving and mounting housing. The two parts of the gearing can be moved out of a first position, in which the corresponding teeth do not engage each other, into a second position, in which the corresponding teeth do engage each other. In a particular, the two-part gearing arrangement has one part of the gearing fixedly connected to the receiving and mounting housing and the other part of the gearing connected to the pulley carrier so as to be able to pivot relative to the pulley carrier. One option for engaging the two parts of the gearing to one another, thus activating or switching the gearing, is for one part of the gearing to be able to move relative to the other part of the gearing by means of an electromagnet.

In particular, there are several embodiments for specifically implementing the gearing. Three embodiments of the gearing are briefly addressed below and are also discussed in detail in conjunction with the figures.

According to a first embodiment gearing, the gearing has a sleeve supported on the receiving and mounting housing which can be moved in the axial direction via internal gearing and external gearing located on a pulley carrier. The sleeve forms the stationary part of the gearing, while the external gearing located on the pulley carrier together with the pulley carrier can be swung relative to the receiving and mounting housing and also relative to the sleeve. When the sleeve is moved into a second position in which the teeth of the external gearing and the internal gearing engage each other, the pulley carrier is locked so that the tensioning means of the invention acts only like a fixed tension roller.

According to a second embodiment of the gearing of the tensioning means of the invention, the gearing includes external gearing located on the receiving and mounting housing and a pot-shaped sleeve, provided with corresponding internal gearing and connected to the pulley carrier, which can be moved in the axial direction. The internal gearing is preferably on the edge of the pot-shaped sleeve such that the pulley carrier can be blocked by the pot-shaped sleeve connected to the pulley carrier or by its internal gearing engaged to the external gearing located on the receiving and mounting housing.

According to another embodiment of the gearing, a first crown gear is formed on the front of the receiving and mounting housing facing the pulley carrier and a corresponding second crown gear is connected to the pulley carrier with the capacity to move in the axial direction. The first crown gear on the receiving and mounting housing thus represents the fixed gearing relative to which the second crown gear, connected to the pulley carrier, can be swung as long as the two crown gears do not engage one another. However, when the second crown gear is moved in the axial direction, e.g., pulled by an electromagnet, toward the first crown gear, then the pulley carrier is locked.

According to still another embodiment, the tensioning means of the invention, in a manner similar to that known in the prior art, is a damping means. However, the damping means includes a damping sleeve which by means of friction damping the movements between the pulley carrier and the receiving and mounting housing the damping in the direction of rising tensioning force is greater than in the direction of decreasing tensioning force. A belt tensioning means with such a damping means is known, for example, in published European Patent Application EP 0 294 919 and corresponding U.S. Pat. No. 4,725,260, the disclosure of which is hereby incorporated by reference. In U.S. Pat. No. 4,725,260, the damping means includes a damping sleeve and a band placed around the damping sleeve and has a first end which is rigidly connected to the receiving and mounting housing and the other end exposed to a spring force.

Preferably, the damping means is constructed as described in published German Patent Application DE 101 31 916 and corresponding published U.S. patent application 2003/0008739 A1, the disclosure of which is hereby incorporated by reference. Specifically, there is a band spring for application of friction force to the damping sleeve. The band spring has a first end strongly attached torsionally to the receiving and mounting housing or to the pulley carrier and a second end strongly attached torsionally to the damping sleeve.

In particular, there are numerous embodiments of the belt tensioning means of the invention, preferred embodiments of which are described in detail below in conjunction with the accompanying drawings.

DETAILED DESCRIPTION OF THE INVENTION

Figure 1:
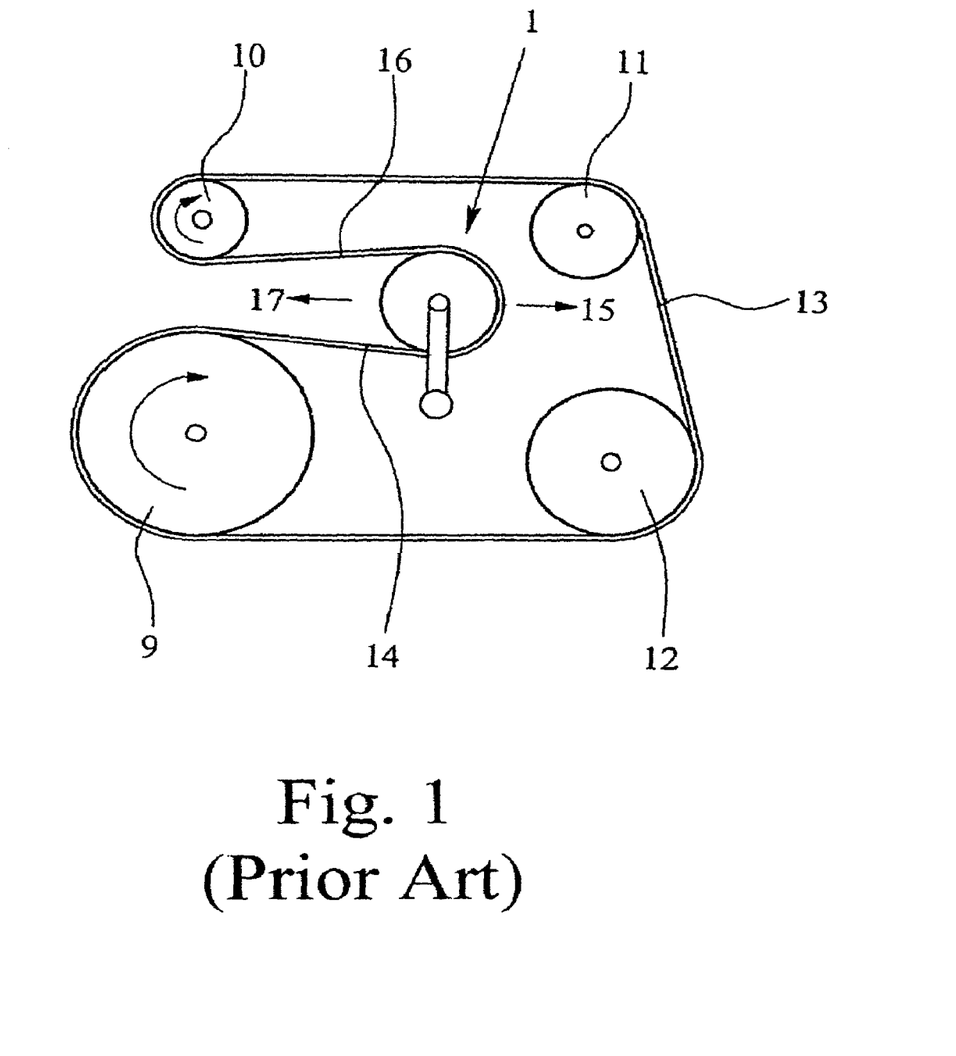
FIG. 1 is a schematic side view of a train of pulleys in a motor vehicle.
Figure 2:
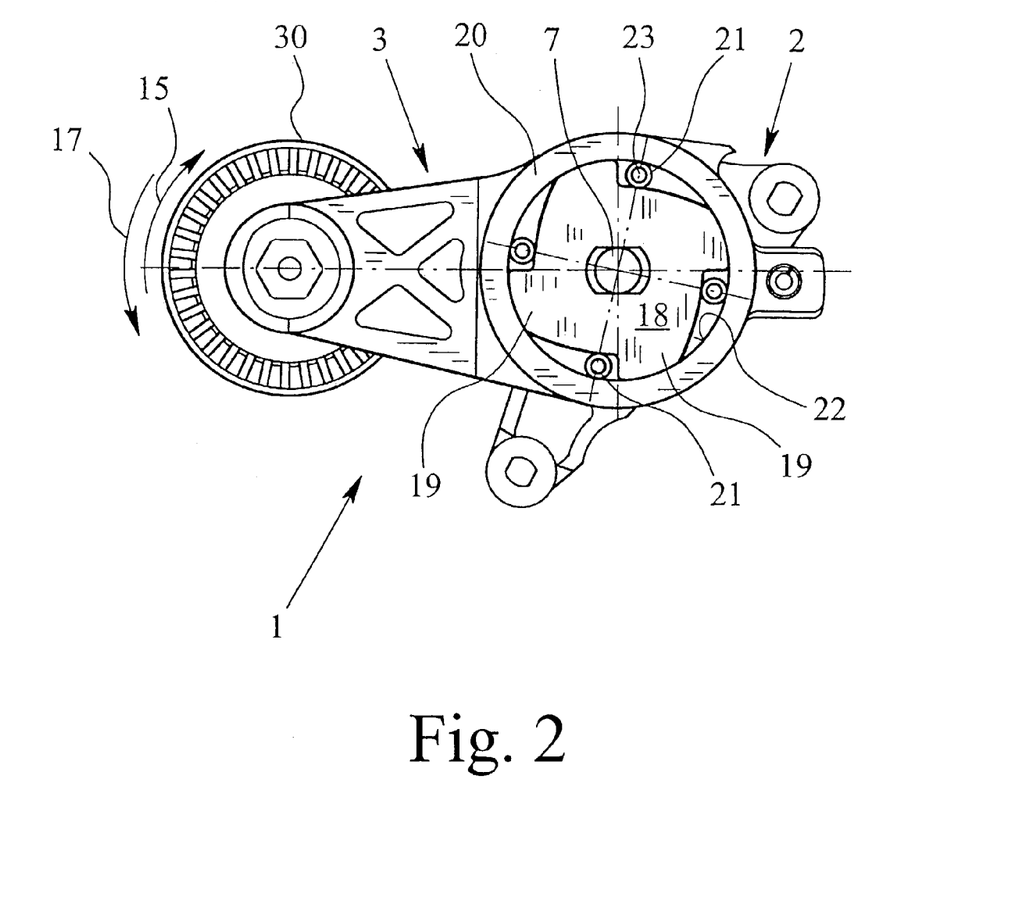
FIG. 2 a rear elevational view of a first preferred embodiment of a belt tensioning means of the invention in the partially mounted state.
Figure 3:
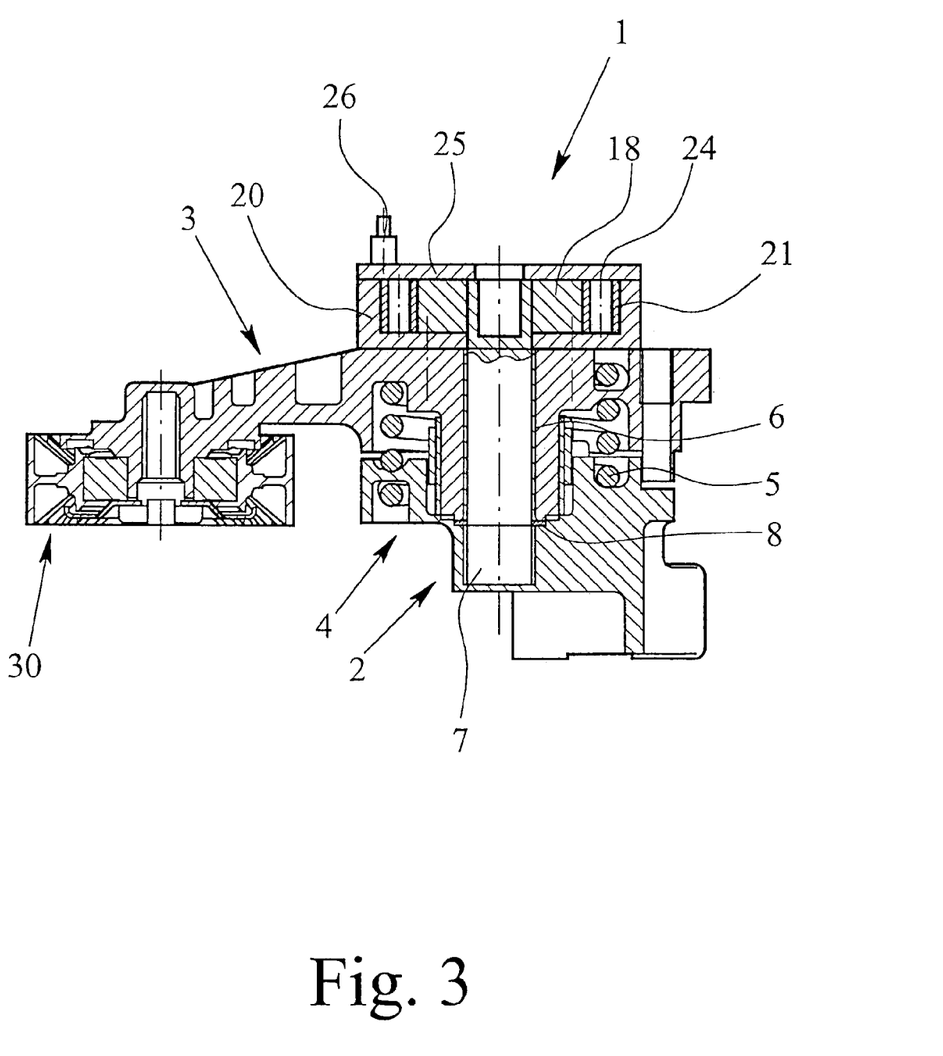
FIG. 3 illustrates a lengthwise section through the belt tensioning means shown in FIG. 2, FIGS. 4a & 4b schematically illustrate part of a second embodiment of a belt tensioning means of the invention, FIGS. 5a & 5b schematically illustrate part of another embodiment of a belt tensioning means of the invention, and FIGS. 6a & 6b schematically illustrate part of a fourth embodiment of a belt tensioning means of the invention.

FIGS. 1–3 show a tensioning means for traction mechanisms, specifically a belt tensioning means 1. The belt tensioning means 1 includes a receiving and mounting housing 2, a pulley carrier 3 pivotally connected to the receiving and mounting housing 2, and a pulley 30. A bearing 4 radially and axially supports the pulley carrier 3 relative to the receiving and mounting housing 2, and a spring 5, in the form of a helical spring, is provided between the pulley carrier 3 and the receiving and mounting housing 2 for application of the tensioning force.

As can be seen in FIG. 3, the bearing 4, which radially and axially supports the pulley carrier 3 relative to the receiving and mounting housing 2, includes a bearing sleeve 6 which is connected to the pulley carrier 3 and a bearing pin 7 which is connected to the receiving and mounting housing 2. The bearing sleeve 6 is used for radial support and a bearing collar 8 is used for axial support.

The train of pulleys shown schematically in FIG. 1 has a main pulley 9 which sits on the crankshaft of the vehicle engine, a second pulley 10 connected via the crankshaft to the belt starter generator, and two other belt pulleys 11, 12 connected to other secondary assemblies. These secondary assemblies are, for example, a water pump and/or a servo pump. The individual belt pulleys 9, 10, 11 and 12 are connected to one another via a continuous drive belt 13 which, when in normal operation of the motor vehicle, is driven via the vehicle engine or the main pulley 9 drives the other pulleys 10, 11, and 12. In normal operation of the motor vehicle in which the main pulley 9 of the vehicle engine drives the drive belt 13, the belt tensioning means 1 is thus on the slack side 14 of the drive belt 13. In this operating state, the drive belt 13 is tensioned by the belt tensioning means 1 in that the pulley carrier 3 is tensioned by the spring so that the pulley carrier 3 presses against the drive belt 13 in the first direction 15.

When it is necessary to start the vehicle engine, the belt starter generator is used as an electric drive so that the drive belt 13 is driven by the belt pulley 10. The belt tensioning means 1 is now on the slack side 16 of the drive belt 13. In this way, the belt tensioning means 1 is pulled against the force of the spring 5 by the drive belt 13 in the second, opposite direction 17, reducing the tension of the drive belt 13.

The belt tensioning means 1 of the invention has a blocking means which enables swinging motion of the pulley carrier 3 relative to the receiving and mounting housing 2 in the first direction 15, but limits or prevents such motion in the second opposite direction 17.

FIGS. 2 & 3 illustrate a first embodiment of belt tensioning means 1 in which a non-positive blocking mechanism is implemented between the receiving and mounting housing 2 and the pulley carrier 3. The blocking mechanism includes a cam disk 18, connected to the receiving and mounting housing 2, having a total of four cams 19 and an outer ball race connected to the pulley carrier 3 in which there are four clamp bodies 21. The clamp bodies 21 in this embodiment are formed by roller bodies arranged between the cam disk 18 and the internal jacket surface 22 of the outer ball race 20. This enables swinging of the pulley carrier 3 in the first direction 15; while, when the roller carrier 3 is swung in the other direction 17, a frictional connection arises between the cam disk 20, the clamp bodies 21 and the internal jacket surface 22 of the outer ball race 20 which precludes relative movement between the cam disk 20 and the internal jacket surface 22.

The non-positive blocking mechanism of this embodiment thus acts in the manner of a freewheel, but with the receiving and mounting housing 2 not being entrained when the pulley carrier 3 swings in the second direction 17, since it is stationary so that the pulley carrier 3 is blocked against swinging in the direction 17. When the blocking mechanism shown in FIGS. 2 & 3 is compared to a free-running clutch, the blocking mechanism can also be called a radial-external freewheel and the cam disk 18 can be called an outside star.

If the train of pulleys shown in FIG. 1 is driven by a belt starter generator operated as an electric drive, the blocking mechanism prevents the belt tensioning means 1 from being pulled against the pre-tensioning force of the spring 5 in the direction 17.

The clamp bodies 21, shown in FIG. 2, each have a hole 23 into which a pin-shaped driver 24 fits. A total of four drivers 24 are located on the cover 25 (FIG. 3) which is guided relative to the pulley carrier 3 to be able to pivot on the bearing pin 7. The rotation of the cover 25, and also the pin-shaped drivers 24, can be controlled, for example, using an electromagnet (not shown here). The cover 25 engages the arm 26, by which the above described blocking mechanism can be turned on and off.

In normal operation of the train of pulleys, the drive belt 13 is driven by the main pulley 9 of the vehicle engine and the cover 25 is rotated such that the drivers 24, which fit into the holes 23 to position the clamp bodies 21 between the cam disk 18 and the inner jacket surface 22 of the outer ball race 20, make it possible for the pulley carrier 3 to swing in the direction 15 via the clamp bodies 21 which roll along the inner jacket surface 22 of the outer ball race 20. In normal operation, there is no frictional adhesion between the cam disk 18, the clamp bodies 21 and the outer ball race 20. Depending on the dimensions and location of the clamp bodies 21, it is even possible to swing in both directions 15, 17 for a small pivot angle. Thus, the blocking mechanism is not effective so that the belt tensioning means 1 acts like a "normal" belt tensioner. If, conversely, the chain of pulleys is driven by the pulley 10 of the belt starter generator, the cover 25 is rotated such that the clamp bodies 21 located between the cam disk 18 and the inner jacket surface 22 of the outer ball race 20 prevent swinging of the pulley carrier 3 when it is pulled by the drive belt 13 in the second direction 17 due to establishment of a frictional connection between the cam disk 18, the clamping bodies 21 and the outer ball race 20. The belt tensioning means 1 then acts like a fixed tension roller.

FIGS. 4a to 6b illustrate three different versions in which a positive locking mechanism is implemented. In each, the locking means is implemented by a two-part gearing which acts between the pulley carrier 3 and the receiving and mounting housing 2, and the two parts of the gearing can be moved out of a first position in which corresponding teeth do not engage each other, into a second position in which the corresponding teeth do engage each other, the movement being produced, e.g., by an electromagnet.

Figure 4A:
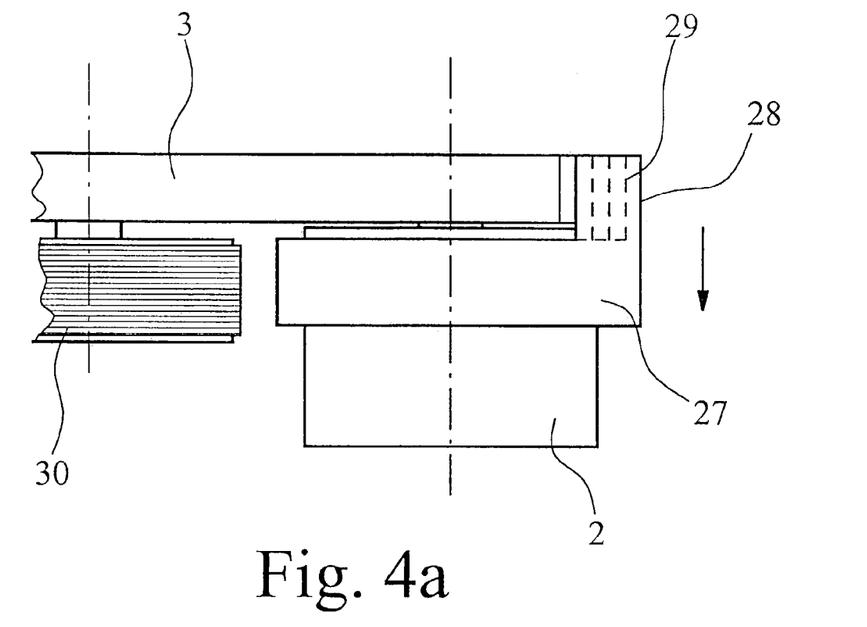
Figure 4B:
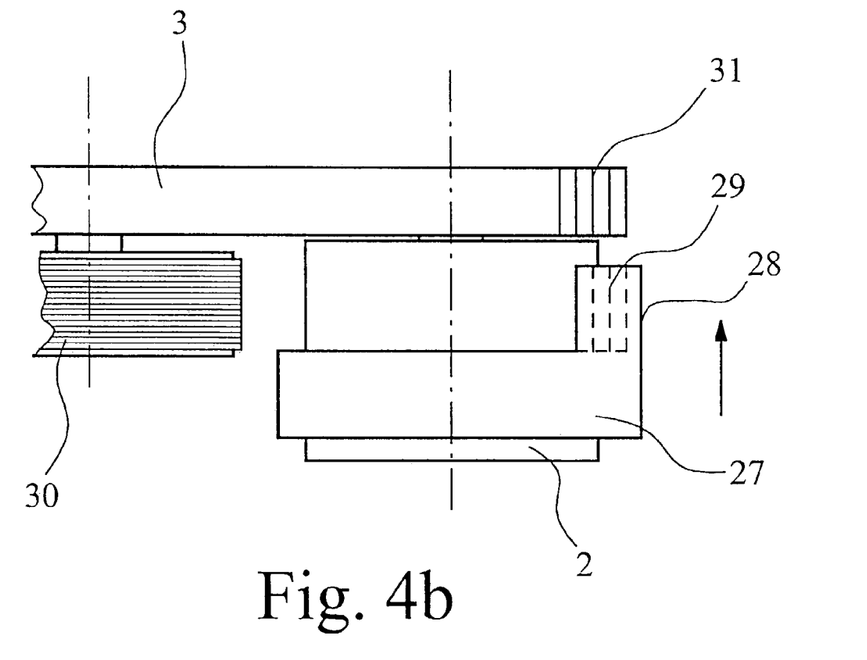

In the embodiment of the belt tensioning means 1 shown in FIGS. 4a & 4b, the two-part gearing is implemented by a sleeve 27 which can be moved in the axial direction, which is supported on the receiving and mounting housing 2 and which has a section 28 which projects in the axial direction and has an internal gearing 29 which interacts with an external gearing 31 on the pulley carrier 3. FIG. 4a shows the locked state in which the sleeve 27 is pushed upward so far that the external gearing 31 on the pulley carrier 3 fits into the internal gearing 29, by which the pulley carrier 3 is locked. In the position shown in FIG. 4b, the sleeve 27 is pushed down so far that the external gearing 31 and the internal gearing 29 do not engage each other so that swinging of the pulley carrier 3 is possible relative to the receiving and mounting housing 2.

Figure 5A:
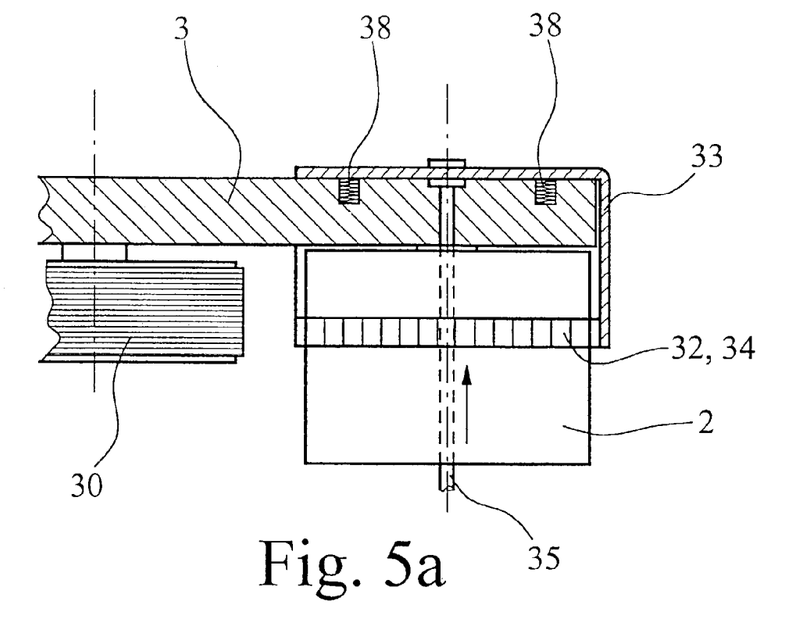
Figure 5B:
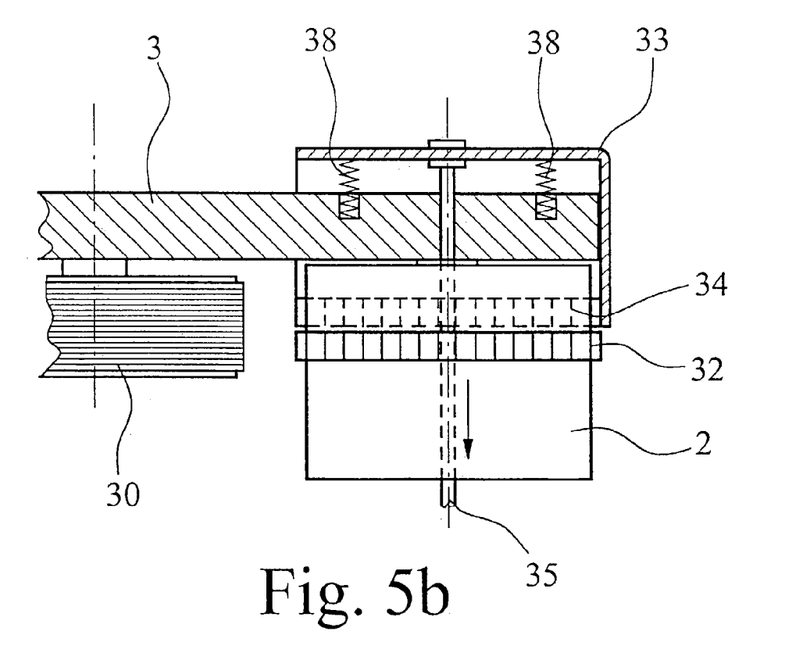

In the version of the belt tensioning means 1 as shown in FIGS. 5a & 5b, the gearing is implemented by an external gearing 32 which is made or located on the receiving and mounting housing 2, and a pot-shaped sleeve 33, the pot-shaped sleeve 33 being connected to the pulley carrier 3 to be able to move in the axial direction and having an internal gearing 34 which corresponds to the external gearing 32. Via an axial guide rod 35, the pot-shaped sleeve 33 can be pulled out of the unlocked position shown in FIG. 5b, against the spring force of the springs 38, down into the locked position shown in FIG. 5a. Transmission of large torques are possible by the external gearing 32, e.g., by gear rims and the internal gearing 34, where the gearing acts over a large peripheral area. In this embodiment the belt tensioning means 1 is in the locked position.

Figure 6A:
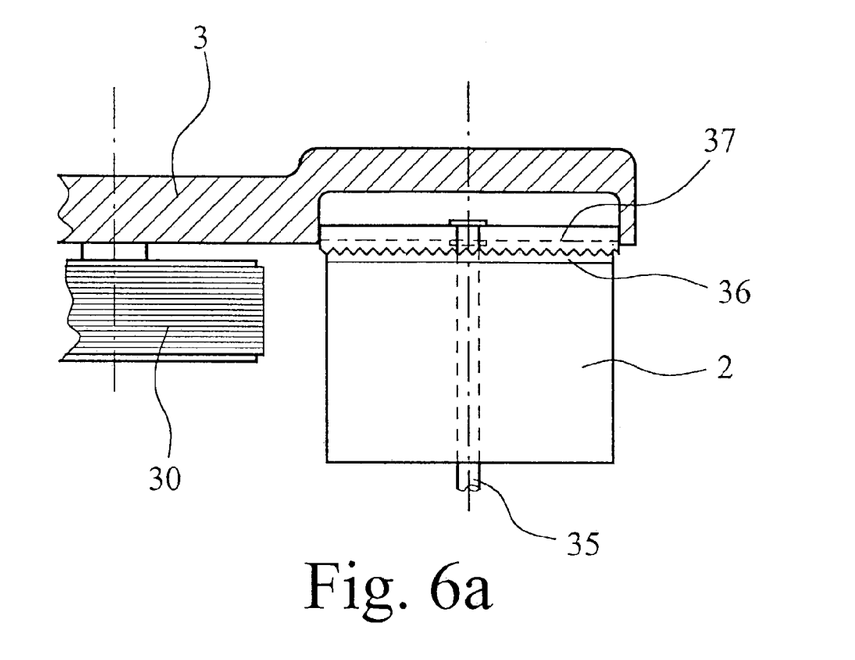
Figure 6B:
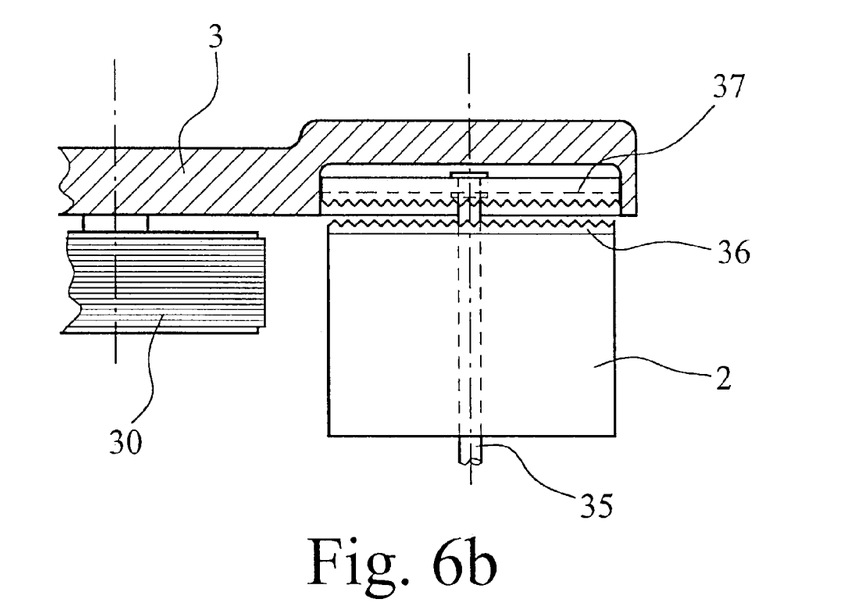

In another embodiment of the belt tensioning means 1 of the invention, shown in FIGS. 6a & 6b, a first crown gear 36 is on the end face of the receiving and mounting housing 2 facing the pulley carrier 3 and a second crown gear 37 is connected to the pulley carrier 3 to be able to move in the axial direction. Like the embodiment of FIGS. 5a & 5b, in this embodiment, there is also an axial guide rod 35 which can pull down the second crown gear 37 connected to the pulley carrier 3 out of the unlocked position shown in FIG. 6b such that the locked position shown in FIG. 6a is reached.

The second crown gear 37 can also be held in the unlocked position in this embodiment by the arrangement of springs (not shown here), especially plate springs, between the pulley carrier 3 and the crown gear 37.

What is claimed is:

1. Tensioning means for traction mechanisms comprising a receiving and mounting housing,
a pulley carrier pivotally connected to the receiving and mounting housing,
a bearing supporting the pulley carrier relative to the receiving and mounting housing,
a spring positioned between the pulley carrier and the receiving and mounting housing for applying a tensioning force therebetween, and
a blocking means which is inactive in a first direction of action for permitting a pivoting motion of the pulley carrier relative to the receiving and mounting housing in said first direction and which is active in an opposite, second direction of action for at least limiting pivoting motion in said opposite, second direction; wherein the blocking means includes a cam disk connected to the receiving and mounting housing, said cam disk having at least one cam surface, wherein the pulley carrier is connected to an outer ball race having at least one clamp body, wherein said blocking means, when active, is operable to produce a frictional connection between the cam disk, the at least one clamp body and an inner jacket surface of said mounting housing which at least limits or prevents the pivoting motion of the pulley carrier relative to the receiving and mounting housing in the second direction; wherein the at least one clamp body has a hole into which a driver fits such that the at least one clamp body is rotatable along said inner jacket surface during pivoting motion of the pulley carrier relative to the receiving and mounting housing in said first direction and wherein the at least one clamp body interacts with the cam disk and the inner jacket surface of the outer ball race to produce frictional adhesion pivoting motion of the pulley carrier relative to the receiving and mounting housing in said opposite, second direction.

2. Tensioning means as claimed in claim 1, wherein the at least one clamp body comprises a plurality of roller bodies.

* * * * *